United States Patent
Rajan et al.

(10) Patent No.: US 12,079,998 B2
(45) Date of Patent: Sep. 3, 2024

(54) IDENTIFYING MOVEMENTS AND GENERATING PRESCRIPTIVE ANALYTICS USING MOVEMENT INTELLIGENCE

(71) Applicant: Uplift Labs, Inc., San Francisco, CA (US)

(72) Inventors: Rahul Rajan, Sunnyvale, CA (US); Jonathan D. Wills, Santa Clara, CA (US); Sukemasa Kabayama, Mountain View, CA (US)

(73) Assignee: Uplift Labs, Inc., San Francisco, CA (US)

( * ) Notice: Subject to any disclaimer, the term of this patent is extended or adjusted under 35 U.S.C. 154(b) by 371 days.

(21) Appl. No.: 17/232,085

(22) Filed: Apr. 15, 2021

(65) Prior Publication Data

US 2022/0067352 A1 Mar. 3, 2022

Related U.S. Application Data

(63) Continuation of application No. 16/280,949, filed on Feb. 20, 2019, now Pat. No. 11,003,900.

(Continued)

(51) Int. Cl.
| | | |
|---|---|---|
| *G06T 7/20* | (2017.01) | |
| *G06T 7/246* | (2017.01) | |
| *G06T 7/73* | (2017.01) | |
| *G06V 40/20* | (2022.01) | |

(52) U.S. Cl.
CPC .............. *G06T 7/20* (2013.01); *G06T 7/251* (2017.01); *G06T 7/75* (2017.01); *G06V 40/23* (2022.01);
(Continued)

(58) Field of Classification Search
CPC .. G06T 7/20; G06T 7/251; G06T 7/75; G06T 2207/30196; G06V 40/20
(Continued)

(56) References Cited

U.S. PATENT DOCUMENTS

| | | |
|---|---|---|
| 9,072,929 B1 | 7/2015 | Rush et al. |
| 2009/0232353 A1 | 9/2009 | Sundaresan et al. |

(Continued)

FOREIGN PATENT DOCUMENTS

| | | | |
|---|---|---|---|
| JP | 2017-148386 A | 8/2017 | |
| JP | 2017-228100 A | 12/2017 | |

(Continued)

OTHER PUBLICATIONS

PCT International Search Report and Written Opinion, PCT Application No. PCT/US19/18824, dated May 14, 2019, 19 pages.

(Continued)

*Primary Examiner* — Ayodeji O Ayotunde
(74) *Attorney, Agent, or Firm* — Fenwick & West LLP

(57) ABSTRACT

A system identifies a movement and generates prescriptive analytics of that movement. To identify a movement, a system accesses an image of an observation volume where users execute movements. The system identifies a location including an active region in the image. The active region includes a movement region and a surrounding region. The system identifies musculoskeletal points of a user in the location and determines when the user enters the active area. The system identifies a movement of a user in the active region based on the time evolution of key-points in the active region. The system determines descriptive analytics describing the movement. Based on the descriptive analytics, the system generates prescriptive analytics for the movement and provides the prescriptive analytics to the user. The prescriptive analytics may inform future and/or current movements of the user.

20 Claims, 13 Drawing Sheets

Related U.S. Application Data

(60) Provisional application No. 62/633,045, filed on Feb. 20, 2018.

(52) U.S. Cl.
CPC .... *G06T 2207/30196* (2013.01); *G06V 40/20* (2022.01)

(58) Field of Classification Search
USPC .......................................................... 382/107
See application file for complete search history.

(56) References Cited

U.S. PATENT DOCUMENTS

| | | |
|---|---|---|
| 2010/0195865 A1 | 8/2010 | Luff |
| 2014/0163703 A1 | 6/2014 | Chang et al. |
| 2016/0324436 A1 | 11/2016 | Miyazaki et al. |
| 2019/0370537 A1* | 12/2019 | Chen ....................... G06V 10/34 |
| 2020/0097732 A1* | 3/2020 | Doolittle ................ G06V 40/23 |

FOREIGN PATENT DOCUMENTS

| | | |
|---|---|---|
| JP | 2018-005663 A | 1/2018 |
| JP | 2018-022484 A | 2/2018 |
| WO | WO 2018/012432 A1 | 5/2019 |

OTHER PUBLICATIONS

United States Office Action, U.S. Appl. No. 16/280,949, Sep. 3, 2020, 15 pages.

Japan Patent Office, Office Action, JP Patent Application No. 2020-544594, Nov. 2, 2021, 12 pages.

* cited by examiner

IDENTIFYING MOVEMENTS AND GENERATING PRESCRIPTIVE ANALYTICS USING MOVEMENT INTELLIGENCE

CROSS REFERENCE TO RELATED APPLICATIONS

This application is a continuation of U.S. application Ser. No. 16/280,949, filed Feb. 20, 2019 which claims the benefit of priority to U.S. Provisional Application No. 62/633,045, filed Feb. 20, 2018, the disclosure of which is hereby incorporated by reference herein in its entirety for all purposes.

FIELD OF DISCLOSURE

This invention relates generally to identifying a movement and generating analytics, and more specifically to employing a suite of machine learning algorithms to identify active areas, key-points, and movements to generate the analytics.

BACKGROUND

Various methods to identify movements of a user exist. A classic example is motion capture in modern cinema. In motion capture, a user wears small identifying objects at key-points about their body while they execute various movements in an active region. A camera system obtains images of the user and utilizes the captured key-points to generate various analytics for the movement. For example, motion capture systems have been applied to athletes during training sessions such that coaches can derive various heuristics describing their movements.

Movement identification becomes a complex problem when applied to multiple simultaneous users which perform dissimilar movements in different active regions. Unfortunately, related art systems have failed to solve this complex problem without the use of complex indicator systems. To illustrate, the related art system utilize numerous indicator devices attached to each user which may hamper their movements. Additionally, related art systems use visual indicators indicating the extent of an observation volume which limits freedom of movement for users. Related art systems do not address determining active regions and movements of users in those active regions without the use of physical and/or electronic indicators in the observation volume.

DETAILED DESCRIPTION

Figure 1:
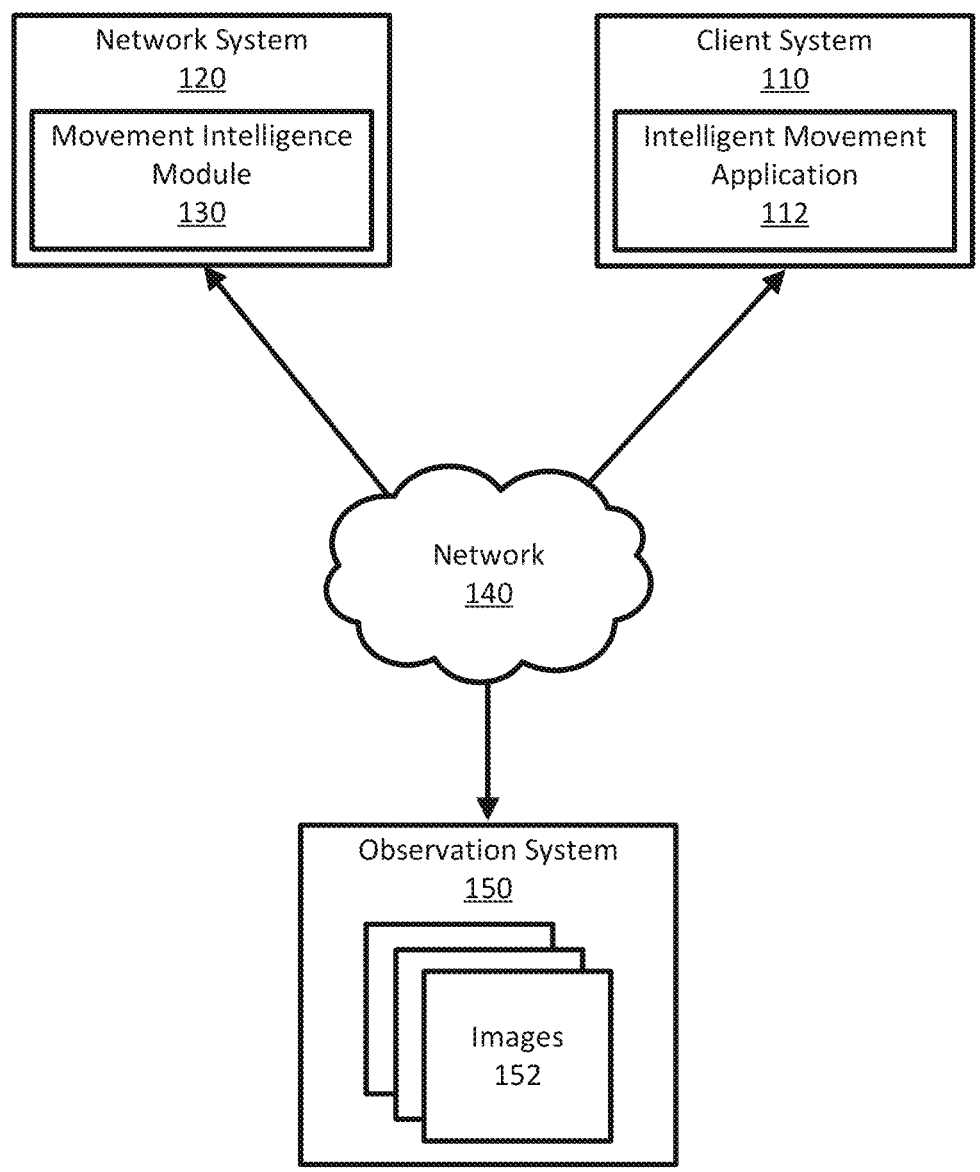
FIG. 1 illustrates a system environment for generating prescriptive analytics for a user, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The disclosed configurations include a system (and method and/or non-transitory computer readable storage medium for identifying a movement of a user in an active region and generating analytics for the identified movement. The generated analytics may be descriptive analytics and/or prescriptive analytics as described in more detail below.

To identify a movement, the system accesses an image of an observation volume. The image includes pixels representing a user and pixels representing an active region. To identify the active region, the system employs a region identification model that identifies the pixels in the image representing a movement region. A movement region are pixels representing a region where a user can perform a movement. The system determines a location for the movement region. The location is a bounding box for pixels of the movement region. The system identifies pixels in the location representing an area surrounding the movement region. The system identifies the movement region and the surrounding region as the active region.

The system identifies when a user enters the active region by analyzing an image of the observation volume. The image include pixels representing the user. To identify when a user enters the active region, the system employs a key-point identification model and identifies pixels in the region corresponding to musculoskeletal key-points of the user. The system determines the user enters the active region when a sufficient number of a user's key-points overlap the active region in the image.

The system identifies a movement of the user by analyzing a series of images of the observation area. The system employs a movement identification model to identify temporal changes in key-points in the active region that represent a movement. The system determines descriptive analytics for the movement by calculating various heuristics for the movement based on the key-points. The system generates prescriptive analytics for the movement by based on the descriptive analytics. The prescriptive analytics can be used by the user to inform a current or previous movement.

I. Introduction

Accurately identifying a movement within an observation volume using only images obtained of that observation volume is a challenging problem. Current movement identification techniques require complex physical and electronic systems to accurately identify movements and generate analytics describing those movements. As described herein, systems and methods are used to identify a movement and generate analytics for that movement in an observation volume. The system includes an observation system 150 that obtains a group of images of the observation volume. A group of machine learning models leverages information in the pixels of the images to identify the movement and generate the analytics.

II. Movement Detection System

Figure (FIG. 1 illustrates a system environment for generating a set or prescriptive analytics for a user. In an embodiment of the system environment 100 ("environment"), a client system 110 generates a request for a set of prescriptive analytics and a network system 120 provides the analytics in response.

The network system 120 includes a movement intelligence module 130 ("MI module") that determines a movement of a person within an active region. To provide context, a movement may be a squat, a bicep curl, a jumping jack, or other types of movement. Similarly, an active region may be a region surrounding a piece of exercise equipment, a region designated for particular movements, or other regions of interest. Additionally, the MI module 130 determines prescriptive analytics and descriptive analytics ("analytics" in the aggregate) for the determined movement in the active region. Prescriptive analytics are recommendations for the determined movement and descriptive analytics are descriptions of accomplished motions. For example, the prescriptive analytics may be a recommendation to improve form, a notification of fatigue, or similar. The descriptive analytics may include a movement summary including number of repetitions, weight lifted, movements executed, or similar. The MI module 130 transmits the analytics to the client system 110 via a network 140.

The client system 110 includes an intelligent movement application 112 ("IMA") configured to present analytics to a user. In an example embodiment of the environment 100, the user is operating the client system 110 and is making a movement in an active region. The MI module 130 identifies the movement of the user, generates analytics for the movement, and transmits the analytics to the client system 110 via the network 140. The IMA 112 presents the analytics to the user. The user utilizes information included in the analytics to inform future and/or current movement. For example, the user may terminate the movement, modify the movement, or begin a new movement.

The MI module 130 generates movement analytics using an image batch of an observation volume received from an observation system 150 via the network 140. An image batch includes one or more images 152 of an observation volume. An observation volume is a volume of space including one or more active regions in which the user may perform a movement. For example, the active region may be a volume surrounding a piece of exercise equipment, a volume where a user may perform a movement, etc. In some embodiments, the images 152 of an image batch may be extracted from a video of the observation volume.

An observation system 150 includes a number of image and/or video capture devices ("capture devices") configured to obtain images 152 in the image batch. The capture devices may be positioned and/or configured such that each capture device obtains an image of the observation volume with different characteristics. For example, capture devices may obtain images that include different fields of view, focal planes, image characteristics (e.g., saturation, hue, etc.), image sizes, etc. Therefore, the images 152 obtained by the observation system 150 include pixels having an information set that may represent the user, the active region, and the observation volume. To illustrate, the information set for a pixel may include a pixel value (e.g., RGB value), a location (or coordinate) of the pixel in the image (e.g., row 2,145, column 1,987), and a time the pixel value was measured (e.g., 4:10 P.M.). As described below, the information set for a pixel may also include any of the identified location, active regions, key-points, users, movements, and analytics associated with that pixel The MI module 130 analyzes the information included in the images to determine a movement of a user in an active region represented in the images 152. The MI module 130 generates analytics for the determined movement.

The network system 120 is in communication with the client system 110 and the observation system 150 via a network(s) 140. In an embodiment, the network 140 is the Internet or any combination of a LAN, a MAN, a WAN, a mobile, wired or wireless network, a private network, or a virtual private network.

The system environment 100 includes systems having a number of "modules." For example, network system 120 includes a MI module 130. Modules refer to hardware components and/or computational logic for providing the specified functionality. That is, a module can be implemented in hardware, firmware, and/or software (e.g., a hardware server comprising computational logic), other embodiments can include additional modules, can distribute functionality between modules, can attribute functionality to more or fewer modules, can be implemented as a standalone program or as part of a network of programs, and can be loaded into memory executable by processors.

The environment 100 may have other embodiments. For example, in some embodiments, the environment 100 may include additional or fewer systems. To illustrate, the network system 120 may include a MI module 130 configured to detect movements of multiple users, each user operating a client system 110. Further, the capabilities attributed to one system within the environment 100 may be distributed to one or more other systems within the system environment 100. For example, any or all of the functionality of the MI module 130 may be accomplished by the IMA 112.

III. Movement Detection and Analytics

Figure 2:
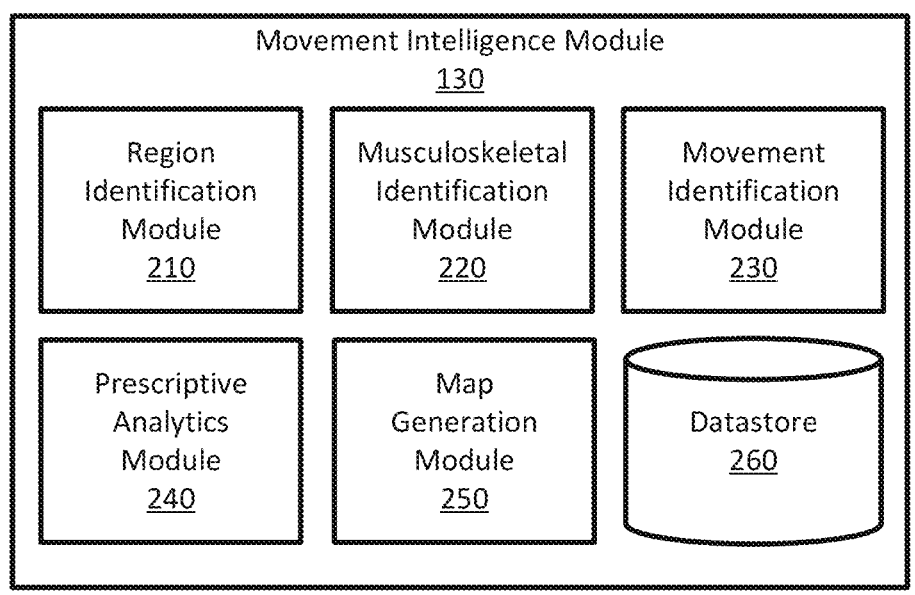
FIG. 2 illustrates a movement intelligence module, according to one example embodiment.

As described above, network system 120 includes a MI module 130 that determines a movement and generates analytics for the determined movement. FIG. 2 illustrates a more detailed example of a MI module, according to one example embodiment. The MI module 130 includes a region identification module 210, a musculoskeletal identification module 220, a movement identification module 230, a prescriptive analytics module 240, a map generation module 250, and a datastore 260. The modules act in conjunction to identify a movement using images of an observation volume and generate movement analytics for the identified movement. For convenience, much of the description is provided for a single image of an observation volume included in an image. However, the functionality of the MI module 130 is applicable to all images 152 in an image batch.

III.A Identifying an Active Region

The region identification module 210 identifies active regions in an image obtained by an observation system 150. An active region is a region where a user can execute a movement. The active region is represented in the image as a group of pixels. An active region includes a movement region and a surrounding region. The movement region is a region or object where a movement occurs. For example, a region identification module 210 identifies a movement region that is a bench press in a gym or a region where a person performs calisthenics. The surrounding region is a region surrounding a movement region. For example, the region identification module 210 identifies a surrounding region as the space surrounding the bench press in the gym of the space surrounding the region where a user performs calisthenics. Thus, an active region in an image includes pixels representing both the movement region and the surrounding region. Other examples of movement regions and their corresponding surrounding regions are possible.

The size of an active region may affect the complexity of identifying movements in the active region. For example, analyzing giga-pixels worth of information to determine a movement in an active region is more computationally expensive and time consuming than analyzing mega-pixels worth of information. As such, the region identification module 210 identifies and active region that is, generally, that smallest active region which allows for accurately detecting a movement of a user in the active region. For example, the active region for a bench press may only include the half of the bench press in which a user moves their arms and the bench press bar, while the half of the bench press including a user's legs is not included in the active region. In another example, the gym may include several bench presses in close proximity. Accordingly, the region identification module 210 identifies an active region for a first bench press that is large enough for identifying a movement of a user in that active region while not detecting a movement for a second, adjacent bench press.

The region identification module 210 employs a region identification model ("region model") to determine active regions in the image. In an example, the region model is convolutional neural network implementing an image segmentation model, but other types of models are also possible. To identify active regions in an image, the region identification module 210 accesses an image of an observation volume and inputs an image into the region identification model. For example, the pixels of the image may be the input vector to a first layer of the convolutional neural network of the region identification model.

The region identification module 210 identifies latent information in the pixels that represent a movement region in the image. For example, the convolutional neural network applies various functions to the nodes in the first layer (and any intermediate layers) that act to reduce the dimensionality of the first layer to an identification layer. The identification layer identifies latent information in the image indicating that a bench press is in the image. The convolutional neural network applies various functions to the identification layer (and any intermediate layers) to generate a segmented image. The segmented image is the accessed image including pixels labelled as a movement region. For example, the segmented image is the accessed image including pixels representing a bench press labelled as a bench press.

The region identification module 210 identifies a location including the active region. To identify a location, the region identification module 210 generates a bounding box for the movement region identified in an image. Thus, the location is a group of pixels in the segmented image including the pixels labelled as a movement region and the other pixels within the bounding box. Generally, the location is a geometric shape such as a rectangle, but could be other shapes. For example, continuing from previously, the region identification module 210 generates a rectangular bounding box surrounding pixels of the movement area labelled as a bench press. The location includes the labelled pixels and the additional pixels in the bounding box.

The region identification module 210 identifies an active region from pixels in the location. As described above, the active region is the smallest number of pixels that allow for the identification of a movement in that active region. The region identification module 210 employs a convex hull algorithm to determine an active region. A convex hull algorithm determines the fewest number of pixels in the location the enable the MI module 130 to determine a movement. For example, the region identification module 210 identifies an active region as a movement region including pixels labelled as a bench press and a group of surrounding pixels that surround the bench press. The identified active regions is the smallest group of pixels that enables the MI module 130 to identify a bench press movement within the active region. Some example convex hull identification algorithms include Graham Scan or Marching Squares, but other algorithms are also possible.

In some examples, an observation volume includes more than one active regions, and, therefore, an image may include pixels representing more than one active region. In these cases the region identification module 210 identifies an active region for each of the active regions included in the image. Importantly, each of the active regions may have a different or similar label. A label indicates the type of active region represented by the pixels. For example, an active region may be labelled as bench press or treadmill. A label for an active region may influence the types of movements that can be identified in that region. For example, a first active region may have a first label and the MI module 130 identifies movements in the first active region associated with the first label but not a second label. To illustrate, the region identification module 210 identifies an active region labelled as bench press and an active region labelled as treadmill. The MI module 130 identifies movements associated with the bench press, but not the treadmill, in its active region and vice versa. The MI module 130 also identifies the corresponding locations for each active region.

The region identification module 210 outputs a data structure including the identified locations, active regions, and their associated labels. For example, the region identification module 210 identifies a bench press and a treadmill in an image. As such, the region identification module 210 outputs a data structure including the location, the active region, and the label for both the bench press and the treadmill. The location and active region are associated with their corresponding pixels such that those pixels may be referenced by other modules in the MI module 130. In some examples, the locations and active regions may be assigned a coordinate system, as described below. The data structure allows the MI module 130 to more easily determine motions in an accessed image.

The models and algorithms employed by the region identification module 210 may be trained in a variety of manners. For example, the region identification model may be trained on a training set. A training set may be a group of images stored in a gym equipment databased. The gym equipment database includes a number of segmented images that are previously labelled with active regions such as bench press, tread mill, squat rack, etc. The region identification module 210 trains the region model to identify active regions including the various active regions. In another example, an operator of the client system 110 and/or network system 120 may label active regions in an image obtained by an observation batch. For example, an administrator of the network system 120 may configure the MI module 130 by labelling appropriate active regions. In another example, the region identification module may suggest active regions to a user and the user can accept and label the active regions in response. Various other models employed by the MI module 130 as described herein may be trained in a similar manner.

III.B Determining Musculoskeletal Key-Points

The musculoskeletal ("MS") identification module 220 identifies musculoskeletal points of a user in the observation volume ("key-points"). Key-points are one or more points that may be used to generate a musculoskeletal representation of a user. For example, the key-points may include ankles, knees, elbows, shoulder, etc. that represent the musculoskeletal structure of a user. The key-points can include a various number of points, such as, for example, five, ten, eighteen, thirty, or more.

The MS identification module 220 employs a key-point identification model to determine key-points in an image. In an example, the key-point identification model is a convolutional neural network implementing an image segmentation model, but other types of classifier models are also possible. To identify key-points in an image, the MS identification module 220 accesses an image of an observation volume and inputs an image into the key-point identification model. For example, the pixels of the image may be the input vector to a first layer of the convolutional neural network of the key-point identification model. Similarly to above, the MS identification module 220 applies various functions to the accessed image to reduce its dimensionality, identify the key-points, and generate a data structure including labels for the various key-points. For example, MS identification module 220 applies one or more functions to reduce the first layer (and any intermediate layers) to an identification layer and identifies the key-points in the identification layer. The MS identification module 220 applies one or more functions to the identification layer (and any intermediate layers) to generate a data structure including the positions of the key-points in the accessed image. Identified key-points may be associated with a pixel, or group of pixels, in the accessed image. As such, each key-point may be assigned a coordinate in the coordinate system of the image.

In an embodiment, the key-point identification model employs an inverse kinematics functions to determine key-points and/or key-point movements that cannot be identified using classifier models (e.g., a convolutional neural network). Here, the MS identification model identifies key-points in an image using a classifier model and infers additional key-points using an inverse kinematics function. For example, a key-point identification model identifies key-point representing the shoulders, neck, and hips, but is not configured to identify the spinal column. In this case, the inverse kinematics function identifies key-points associated with the spine using the key-points off the shoulders, neck, and hips. Other examples are possible. Additionally, the inverse kinematics functions may used to identify various other anatomical parts of the body, such as, for example, muscle groups, connective tissues, etc.

In an embodiment, rather than analyzing an entire accessed image to identify key-points, the MS identification module 220 inputs the pixels of a location into the key-point identification model. For example, the region identification module 210 identifies a location surrounding a bench press and the MS identification module 220 inputs the pixels of the location into the key-point identification model. The MS identification module 220 identifies the key-points of a user in the location. In this manner, the MS identification module 220 identifies key-points localized to location and active regions rather than in an entire image. Localized identification is computationally less expensive than identifying key-points in an entire image.

In an embodiment, the MS identification module 220 identifies key-points located within an active region ("active key-points"). Active key-points are key-points that may be indicative of a user executing a movement in the active region. For example, a user is exercising in a gym that includes a bench press and the user approaches the bench press to begin exercising. The MS identification module 220 identifies that a user has entered a location and identifies the key-points for the user. However, as the key-points are not within the active region, the key-points are not yet active key-points. In the gym, the user enters the active region by laying on the bench press and beginning to lift weights. The MS identification module determines the user has entered an active region when, for example, a sufficient number of key-points and/or the appropriate key-points are in the active region. The MS identification module 220 identifies that the key-points are active key-points because they are within the active region. In other words, active key-points are key-points that overlap the active region in the image. As described below, the MI module 130 may utilize active key-points to determine movements in the active region.

The MS identification module 220 employs a key-point identification model configured to identify key-points despite occlusions in an image. An occlusion occurs when a key-point for a user is occluded from view in an image by an object. For example, a user's elbow may be behind a bench of the bench press at the bottom of a repetition. As such, the user's elbow is not visible in the image of the user. However, the MS identification module 220 is configured to identify the occluded elbow despite it not being visible in the image. In an embodiment, the MS identification module 220 employs time interpolation to identify occluded key-points. Time interpolation monitors the evolution of a key-point over time. If at some point the key-point becomes occluded in the image, the MS identification module 220 can interpolate any of the previous occurrences of the key-point to infer the current (or previous) location of a key-point in the image. In another embodiment, the MS identification module 220 employs a spatial interpolation to identify occluded key-points. For example, some key-points have relative spatial orientations (e.g., two eyes). In this case, the MS identification module 220 can interpolate the occluded key-point based on the surrounding key-points. In an embodiment, the MS identification module 220 utilize spatial reconstruction accomplished by the MI module 130 to determine an occluded key-point. Spatial reconstruction is described in more detail below. Simply, the MI module 130 analyzes the same active region from images obtained at different viewpoints. Key-points that are occluded in one image may not be occluded in other images. The MI module 130 spatially reconstructs the observation volume and the MS identification module may more accurately determine key-points.

In an embodiment, the MS identification module 220 employs a user recognition model to identify users in an active region. The user recognition model may be a facial recognition algorithm, gait recognition algorithm, musculoskeletal recognition algorithm, or similar. For example, the MS identification module 220 identifies the location of the key-points corresponding to user's neck, eyes, and shoulders. The MS identification module 220 inputs the pixels surrounding those key-points into a facial recognition algorithm and identifies the user. The MS identification module 220 associates the key-points and any determined movements in that active region with an identified user.

The MS identification module 220 outputs a data structure including the identified key-points and any identified users. In some examples, the MS identification module 220 appends the data structure including the location, active region, and region label with identified key-points and users. This data structure is a high level temporal snapshot of the observation volume. The MI module 130 leverages key-points associated with users near an active regions to identify movements. For example, the key-points near a bench press may be used to identify movements corresponding to a particular user lifting weights.

III.C Determining Movements and Descriptive Analytics

The movement identification module 230 identifies movements and descriptive analytics for that movement in an observation volume. Again, a movement is any action, movement, exercise, etc. that a user may take in the observation volume and descriptive analytics are derivable heuristics that describe those movements. As described above, the MS identification module 220 identifies key-points for a user in an observation volume using an image obtained by an observation system 150. However, determining a movement is not possible from an image representing a single moment in time. As such, the movement identification module 230 leverages a series of images of the observation volume obtained by the observation system 150.

Within the system environment 100, the observation system 150 continually obtains images ("image stream"). The image stream, in other words, includes a series of temporally adjacent images that represent the time evolution of the observation volume. The region identification module 210 and the MS identification module 220 continually identify active regions and key-points, respectively, using the image stream. The movement identification module 230 identifies temporal changes in key-points in an image stream to determine movements.

To illustrate, consider, for example, a user performing jumping jacks in an observation volume. An observation system 150 obtains an image of the user at time to while the user is executing the jumping jack. The region identification module 210 identifies that the user is in an active region in the observation volume at $t_0$. Further, the MS identification module 220 identifies a key-point representing the users hand at $t_0$. The observation system 150 obtains an image of the user at time $t_1$ as the user continues the jumping jack. The region identification module 210 identifies that the user is in the same active region at $t_1$. The MS identification module 220 identifies a key-point representing the users hand is in the same region at time $t_1$. However, the key-point representing the users hand is at a different pixel at time $t_1$ than at time to. The process continues similarly for time $t_3, t_4, t_5, \ldots, t_n$. The movement identification module 230 leverages the temporal evolution of the key-points representing the users hand to determine that the user is executing a jumping jack.

Identifying key-points and active regions in every frame of an image stream is computationally expensive. Thus, in some cases, the MI module 130 may perform actions to improve identification speed and performance. In an embodiment, the region identification module 210 identifies active regions at particular intervals rather than continuously. For example, in a gym setting, many of the active regions remain relatively stationary and continuously identifying active regions is unnecessary. Thus, the region identification module 210 only identifies active regions, for example, every thirty minutes and updates the data structure including the bounding box, the active region, and the region label accordingly. In an embodiment, the movement identification module 230 may temporally filter images in an image stream. For example, the MS identification module 220 may only analyze one image of an image stream every 30 ms. Similarly, the MS identification module 220 may temporally interpolate images over a time window (e.g., 10 ms) rather than using every image in that time window.

The movement identification module 230 employs a movement model to determine movements in the observation volume. In an example, the movement model is a sequence classification model such as, for example, a Recombinant Neural Network or Hidden Markov Model, but other types of classifier models are also possible. To identify movement in the image, the movement identification module 230 accesses a time series of key-points for a particular user in the observation volume and inputs an image into the movement model. For example, the MI module 130 accesses the time series information of key-points representing a user's hands, elbows, shoulders, hips, knees, and feet while they are executing a jumping jack. The movement identification module 230 inputs the time series into the movement model and movement identification module 230 identifies that the user is executing a jumping jack. More explicitly, the movement model identifies latent information in the coordinates associated with each key-point as being representative of a jumping jack. So, for example, coordinates for the key-points representing a repetitive arc of two arms and a lateral movement of two legs represent a jumping jack.

In some embodiments, the movement identification module 230 identifies descriptive analytics for the movement. Descriptive analytics are a more robust description of an identified movement in an observation volume. For example, the movement identification module 230 may employ a movement model configured to calculate joint angles, speed, acceleration, force, and repetitive motions. To illustrate, the movement identification module 230 may determine that the speed and acceleration of a user's hand in an accessed image by analyzing the spatial changes of the key-point associated with the hand over time. Additionally, the movement identification module 230 may calculate the angle between the user's ankle, knee, and hip based on spatial representation of their associated key-points. Additionally, the movement identification module 230 can determine a number of repetitions for a movement. In this case, the movement model may include a Hidden Markov Model ("HMM") trained to identify hidden states of movement repetitions. For example, the HMI may identify a repetitions for bicep curl by identifying a starting position, a concentric contraction, an eccentric contraction, and an end position. Additionally, the movement identification module 230 can identify force performed by user object or force performed on an object. For example, the MI module 130 may calculate the force of a user lifting a bar during a squat. In this case, the movement model may include classifier models to identify an amount of weight for a user or an object in an image. To illustrate, the movement identification model can identify the weight of a dumbbell a user is using to execute tri-cep kickbacks. In examples where the movement identification model is configured to calculate a force, the movement model is configured to identify masses in the image. For example, the movement identification module 230 may identify the amount of weight on a bench press, the weight of a dumbbell, etc. using various machine learning algorithms.

As described above, in some examples, it is computationally expensive to identify movements (and descriptive motion analytics) in an observation volume by analyzing an entire accessed image. Thus, in an embodiment, the movement identification module 230 identifies movements using active key-points. That is, the movement identification module 230 identifies movement using the key-points of a user that are located in an active region. For example, a user approaches a bench press and begins weight lifting. The movement identification module 230 identifies that the key-points for the user are active key-points and the movement identification module 230 uses the active key-points to identify movements for the user. In other words, movement identification occurs when they key-points of a user overlap the active region.

Additionally, the movement identification module 230 may act to identify movements in an active region based on a variety of conditions. In other words, in order to decrease computational requirements, the movement identification module 230 acts to identify movements, or types of movements, in some circumstances while not in others. For example, in an embodiment, the movement identification module 230 identifies a movement for an active region based on the label for that active region. To illustrate, the movement identification module 230 may identify a movement as a squat in an active region that is a squat rack, but would not identify a movement that is a bicep curl in the same active region. In an embodiment, for example, the movement identification module 230 identifies a movement in an active region when a threshold number of active key-points are identified. To illustrate, the movement identification module 230 may not identify a movement in an active region that is a treadmill if only two active key-points are identified and the threshold number of active key-points is ten. In an embodiment, for example, the movement identification module 230 identifies a movement in an active region when the appropriate active key-points are present in the active region. To illustrate, the movement identification module 230 identifies a movement that is a bench press when the appropriate active key-points are present in an active region that is a bench press (e.g., shoulders, hands, head, torso, etc.). However, the movement identification module 230 does not identify a bench press when inappropriate key-points are present in the active region (e.g., feet, knee, ankle, etc.).

The movement identification module 230 outputs a data structure including the identified movements and descriptive movement analytics. In some examples, the movement identification module 230 appends the data structure including the location, active region, region label, key-points, and user with identified movements and descriptive motion analytics. In this manner, the data structure represents a snap shot of what is occurring in the various active regions within the observation volume.

In some examples, the movements and descriptive motion analytics for a movement taken by a user may be stored in a profile for the user stored in the datastore 260. Thus, the MI module 130 can generate a movement summary for the user. The movement summary includes information regarding the movements of the user within the observation volume. The movement identification module 230 may calculate various other heuristics to include in the movement summary. For example, the movement identification module 230 can include changes in range of motion, increases in resistance, changes in repetitions, etc. The MI module 130 may transmit the movement summary to the PMA 112 for display on the client system 110. Providing the movement summary to the client system 110 allows the user to be informed of their movement and changes to their movement.

In some cases, movement identification module 230 calculates similar heuristics for identified key-points and the heuristics may be used to identify a movement. Here, movement identification module 230 inputs heuristics and key-points into the movement model to identify a movement. For example, the movement identification module 230 calculates an angle between an ankle, knee, and elbow for a user performing a movement in an active region. The movement identification model identifies the movement as a squat due, in part, to the repetitive change in angle.

III.D Determining Analytics for a Movement

The prescriptive analytics module 240 generates prescriptive analytics for identified movements in an observation volume. Prescriptive analytics are analytics that a user may utilize to inform current and/or future movements. As an example, prescriptive analytics can include an analysis of movement form, over and/or under exertion, injury prevention, rest profiles, and movement encouragement.

The prescriptive analytics module 240 employs an analytics model to determine prescriptive analytics for movements executed in the observation volume. In an example, the analytics model is a machine-learning model such as, for example, a regression model configured for movement prediction, but other types of models, such as inverse reinforcement learning models, are also possible. To generate prescriptive analytics, the prescriptive analytics module 240 accesses a movement and its associated descriptive analytics and inputs the movement and descriptive analytics into the analytics module. For example, the prescriptive analytics module 240 accesses an identified movement of running in an active region of a treadmill. The prescriptive module 240 also access the descriptive analytics for the running movement. The descriptive analytics include the speed the user is running, the distance the user has ran, the range of motion of the users legs, the range of motion of the users arms, etc. The prescriptive analytics module 240 inputs the movement and the descriptive analytics into the analytics model and the prescriptive movement identification module 230 generates prescriptive analytics indicating that the user should focus on even movement of their arms. More explicitly, the analytic model identifies latent information in the range of motion of the users arms while running associated with decreased running performance. For example, the range of motion is 15 degrees while improved running performance is associated with a 50 degree range of motion. In response, the prescriptive analytics module 240 generates prescriptive analytics to increase the range of motion of the arms while running.

Other examples for generating prescriptive analytics are possible. In an embodiment, the prescriptive analytics module 240 employs an analytics model configured to identify form in a movement. Form is an indicator for movement quality, with high quality form indicating a generally correct movement, and low-quality form indicating a generally incorrect movement. For example, when performing a squat movement, achieving a high-quality form includes a particular set of descriptive analytics, such as, for example, (i) key-points representing the hip, ankle, and knee in correct alignments, (ii) a range of motion above a threshold range of motion, (iii) key-points representing a straight spine, and (iv) steady upward force exerted on the bar by the user. The prescriptive analytics module 240 inputs the descriptive analytics into the analytics model and the prescriptive analytics module 240 generates prescriptive analytics. As an example, the prescriptive analytics module 240 generates prescriptive analytics recommending the user to keep the chest lifted at the bottom of a squat. The prescriptive analytics here are provided an example. Other types of prescriptive analytics are also possible. Some are described below, but are not intended to be limiting.

In an embodiment, the prescriptive analytics module 240 employs an analytics model configured to identifying over and/or under exertion in a movement. A movement including over-exertion includes a movement corresponding to fatigue and/or hazardous movement. For example, when performing a running movement, over-exertion may be associated with a particular set of descriptive analytics, such as, for example, (i) irregularities in gait, (ii) decreased ranges of motion, (iii) distances above a threshold distance, and (iv) decreased force by a user's foot on the treadmill (i.e., shuffling). The prescriptive analytics module 240 inputs the descriptive analytics into the analytics model and the prescriptive analytics module 240 generates prescriptive analytics. As an example, the prescriptive analytics module 240 generates prescriptive analytics recommending the user to stop running because they appear overly fatigued. Similar example for under exertion are possible. As a brief example, the prescriptive analytics module 240 generates prescriptive analytics to increase weight during a shoulder press in order to increase performance. Other examples of under exertion and/or over exertion are possible.

In an embodiment, the prescriptive analytics module 240 employs an analytics model configured to generate prescriptive analytics based on previous performance for a user. For example, as previously described, a movement summary for each user is generated when executing movements in the observation volume. The prescriptive analytics module 240 inputs the previous motions summaries into the analytics model and the prescriptive analytics module 240 generates prescriptive analytics. The prescriptive analytics module 240 generates prescriptive analytics indicating their current performance relative to their historic performance for that movement. As an example, the prescriptive analytics can indicate that the user is running 10% slower than last week at a similar distance during their run. In some cases, the prescriptive analytics may be compared to the historical performance of other users. For example, the prescriptive analytics may indicate that a user is lifting, on average, 15 lbs. more than other users in the same age and sex cohort.

In an embodiment, the prescriptive analytics module 240 employs an analytics model configured to inform a user as to injury prevention. In this case, the prescriptive analytics model can utilize any of the algorithms described herein to determine if a movement is indicative of injury. For example, the prescriptive analytics module 240 inputs the movement and descriptive analytics into the analytics model. The prescriptive analytics module 240 determines that the user is fatigued and using bad form in a movement. Thus, the prescriptive analytics module 240 generates prescriptive analytics encouraging the user to stop their workout because their current chance of injury is above a threshold chance of injury.

The prescriptive analytics module 240 can be trained using various methods. In an embodiment, the prescriptive analytics module 240 is trained using movements recorded when be executed by an expert ("expert movement"). In this case, prescriptive analytics 240 module determines analytics for the expert movement ("expert analytics") and compares the expert analytics to any identified movements and their analytics. For example, a certified personal trainer is executing a squat motion in a squat rack active area within an observation volume. The MI module 130 identifies the motion and determines analytics for that motion. A user (or administrator, or some other entity) classifies the identified movement as an expert movement such that the determined analytics are labeled as expert analytics. Subsequently, a user in the observation volume performs a squat motion in the squat rack active area. The prescriptive analytics module 240 generates prescriptive analytics for the user by comparing the analytics for the identified movement to the expert analytics.

In a similar embodiment, some movements and their associated analytics may be identified as leading to, or associated with, injury ("problematic analytics"). In these cases, the prescriptive analytics module 240 compares identified movements and analytics with the problematic analytics to generate prescriptive analytics. Additionally, in some embodiments, the analytics model is configured to inform a user as for injury prevention. In this case, the prescriptive analytics model can utilize any of the algorithms described herein to determine if a movement is indicative of injury. For example, the prescriptive analytics module 240 inputs the movement and descriptive analytics into the analytics model. The prescriptive analytics module 240 determines that the user is fatigued and using bad form in a movement. Thus, the prescriptive analytics module 240 generates prescriptive analytics encouraging the user to stop their workout because their current chance of injury is above a threshold chance of injury.

In some examples, the prescriptive analytics for a movement may be stored in a profile for the user that executed the movement as part of the movement summary. Additionally, the MI module 130 may transmit the prescriptive analytics to the prescriptive motion application for display on the client system 110. Providing the prescriptive analytics to the client system 110 informs the user for changes to their movement that may be beneficial.

III.E Three-Dimensional Identification

Although previous description has described the MI module 130 identifying movements and generating analytics using a single image, the MI module 130 is also configured to identify movements and analytics using images in an image batch. To elaborate, the observation system 150 obtains a number of images 152 of the observation volume. Each of the images may have different image characteristics depending on the configuration of the capture device that obtained the image. The various images, in aggregate, include information that may be used to identify a user, an active region, and/or a movement ("articles" in the aggregate) in an observation volume. In some embodiments, the MI module 130 may generate a single representation of the observation volume in three dimensional space ("volume map") using the two dimensional images in an image batch.

A map generation module 250 generates a volume map of the observation volume. The map generation module 250 inputs images from an image received from an observation system 150 and outputs the volume map. In an embodiment, the volume map is a data structure describing the location, active region, labels, key-points, movements, and descriptive analytics in three dimensional space rather than the two dimensional space of an image. For example, rather than a location being represented by a two dimensional array of pixels, the location is represented by a three-dimensional array of voxels (i.e., volume pixels). Additionally, each of the key-points may be associated with a three-dimensional coordinate rather than a two-dimensional coordinate.

The map generation module 250 generates a volume map by mapping information in images of an image batch to a volume map. There are many methods to reconstruct a three dimensional volume from a group of two-dimensional images. In one example, the map generation module 250 may access a first image in an image batch having a first field of view and a second image in an image batch having a second field of view. More images having additional or similar field of views are also possible. The map generation module 250 applies one or more transformation functions to the images. The transformation function(s) map information from the two-dimensional images to the volume map. Various known multi-view geometry transformation functions are possible. Generally, as described herein, the transformation functions are calibrated based on the configuration of the observation system 150. In some cases, map generation module 250 employs a depth estimation model to determine depth information when an observation system 150 includes a single capture device. The depth estimation model is a machine learning model configured to estimate the depth in an image.

The map generation module 250 utilizes labelled locations, active regions, and key-points when generating a volume map. For example, the region identification module identifies a first location for a first active region is in multiple images of an image batch. The map generation module 250 uses a transformation function on the pixels of the images including the first location and first active region to generate a three-dimensional representation of the first location and first active region in the volume map. Similar processes occur for all locations, active regions, and key-points identified in an observation volume.

The map generation module 250 accurately maps identified articles in an image batch to a volume map using transformation functions that are based on the particular configuration the configuration of the observation system 150 obtaining the image batch. For example, the capture devices of an observation system 150 configured to observe different observation volumes may have dissimilar configurations. To illustrate, a first observation volume may be a room in a house, while a second observation volume is a weight room in a commercial fitness center. A first observation system 150 including a single video camera is configured to observe the first observation volume and a second observation system 150 including more than ten video cameras is configured to observe the second observation volume. Other observation volumes and observation systems 150 are also possible. The transformation function(s) for mapping a single video feed to a volume map and the transformation function(s) for mapping ten video feeds to a volume map are different.

The map generation module 250 is configured to determine (or modify, or access) transformation functions that accommodate for different observation volumes and/or configurations of observation system 150s when generating a volume maps. In a first example, the datastore 260 includes a set of transformation functions with each transformation function associated with a particular configuration of observation system 150. The map generation module 250 accesses the appropriate transformation function from the datastore 260 when generating a volume map using images received from an observation system 150 with a particular configuration. In a second example, the map generation module 250 executes a configuration operation. During the configuration operation, a user may place one or more configuration objects within the observation volume. The capture devices capture images of the configuration object. Based on the location of the configuration object in the images, the map generation module 250 determines one or more transformation function to generate a volume map using the images obtained by the observation system 150. In a third example, the map generation module 250 receives a configuration for the observation system 150 from a user and generates a transformation function based on the configuration. That is, the map generation module 250 may receive the coordinates of each capture device in the observation system 150 from a user. The map generation module 250 generates one or more transformation functions using the coordinates. Whatever the case, the map generation module 250 is configured to apply one or more transformation functions to images of an image batch that accurately generates a volume map of an observation volume.

Similar to images in an image stream describe above, the map generation module 250 generates volume maps in an observation stream. That is, the map generation module 250 continually generates volume maps representing temporally sequential snapshots of the observation volume in three dimensional space. When generating volume maps for an observation stream, the map generation module 250 maps images in an image batch obtained at approximately the same time. Other methods of temporally grouping images in an image batch are also possible.

The movement model of the movement identification module 230 and the analytics model of the prescriptive analytics module 240 are also configured to operate in three dimensions. For example, the movement identification module 230 inputs three dimensional active key-points input into a movement model and the movement identification model identifies a movement and movement analytics for that movement in the active region. Similarly, the prescriptive analytics module 240 inputs a movement and three-dimensional descriptive analytics into the analytics model and the prescriptive analytics module 240 generates prescriptive analytics reflecting the movement in three dimensional space.

In an embodiment, the volume map is an array of voxels that represent the observation volume. That is, each voxel in a volume map represents a sub-volume of the observation area such that the sub-volumes represented by the group of voxels, in aggregate, approximate the observation volume. In this example, each voxel is associated with the various articles identified by the MI module 130. For example, a voxel data represent a location, an active region, a key-point, a user, or a movement. Further each voxel may also include an information set for that voxel. For example, the voxel includes a coordinate, a voxel value, a time associated with when the images used to generate the voxel were obtained, etc.

The map generation module 250 may generate a visualization of articles within the observation volume in three dimensions for display to a user of the client system 110. This allows the user to visualize their movements after they have executed them. Additionally, the visualization may be accessed by an administrator to identify areas where occlusion is common, crowding for multiple users occurs, and active regions having high usage.

The map generation module 250 generates coordinate systems for the articles in two dimensions and/or three dimensions. For example, the map generation module 250 assigns a coordinate system in meters per pixel to pixels based on a calibration process for the capture system used to obtain the image (e.g., a calibration image or images). In another example, the map generation module 250 assigns a unit-less coordinate system to an article in a volume map because some of the models described herein have increased accuracy when the inputs are in a unit-less coordinate system.

IV. Movement Detection and Analytics Methods

Figure 3:
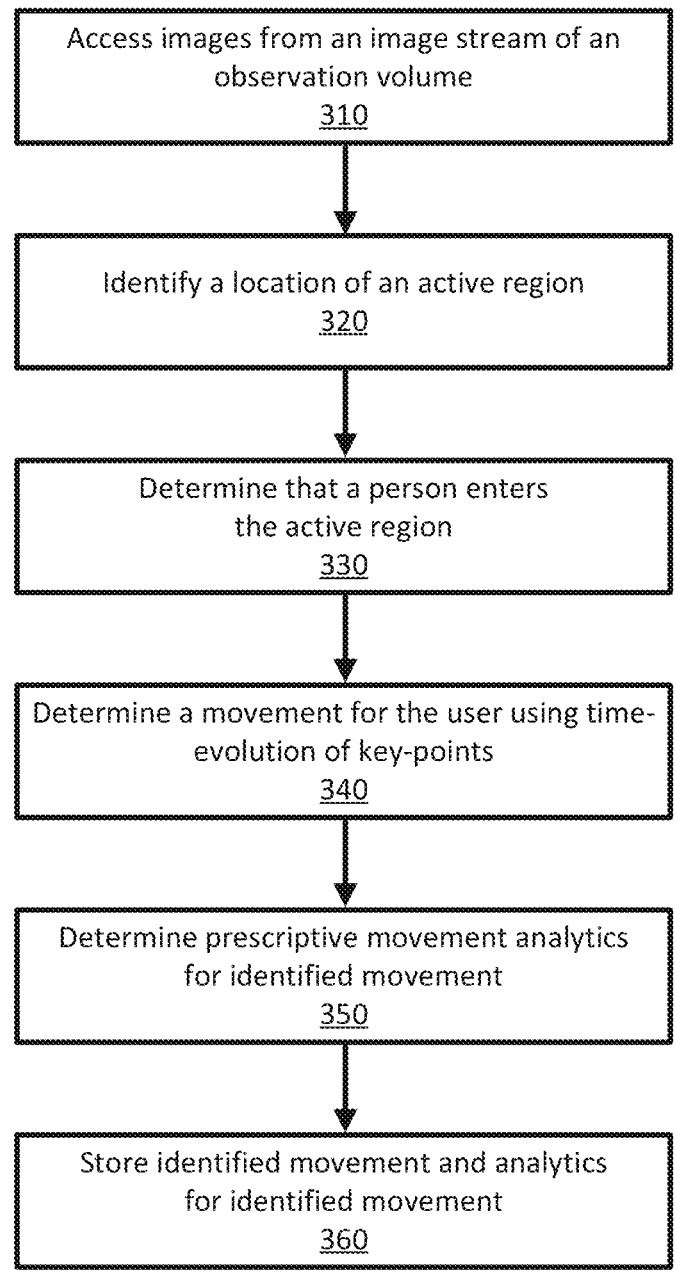
FIG. 3 illustrates a flow diagram of a method for identifying a movement and generating prescriptive analytics for that movement, according to one example embodiment.

As described herein, a MI module 130 of a network system 120 identifies a movement and generates prescriptive analytics for that movement. FIG. 3 illustrates a flow diagram of a method for identifying a movement and generating prescriptive analytics for that movement, according to one example embodiment. The method 300 will be described in reference to FIGS. 4A-4D to provide added clarity. In various embodiments, the method 300 can include additional or fewer steps and/or the steps may occur in another order.

In the example method 300, the environment 100 includes a user operating a client system 110 including an IMA 112 in an observation volume. The environment 100 includes an observation system 150 including an array of capture devices configured to obtain image batches of the observation volume. Here, the observation volume is a gym including two active regions: a treadmill machine and a shoulder press machine.

The observation system 150 obtains an image stream of the observation volume. The image stream includes a series of image batches, with each image batch in the stream including images of the observation volume obtained at approximately the same time. The MI module 130 accesses 310 the image stream from the observation system 150 via a network 140. Each of the images in an image stream include a number of pixels, and each pixel is associated with an information set. The information set includes, for example, the pixel value, the coordinate of the pixel in the image, and the time at which the image was obtained by the observation system 150.

Figure 4A:
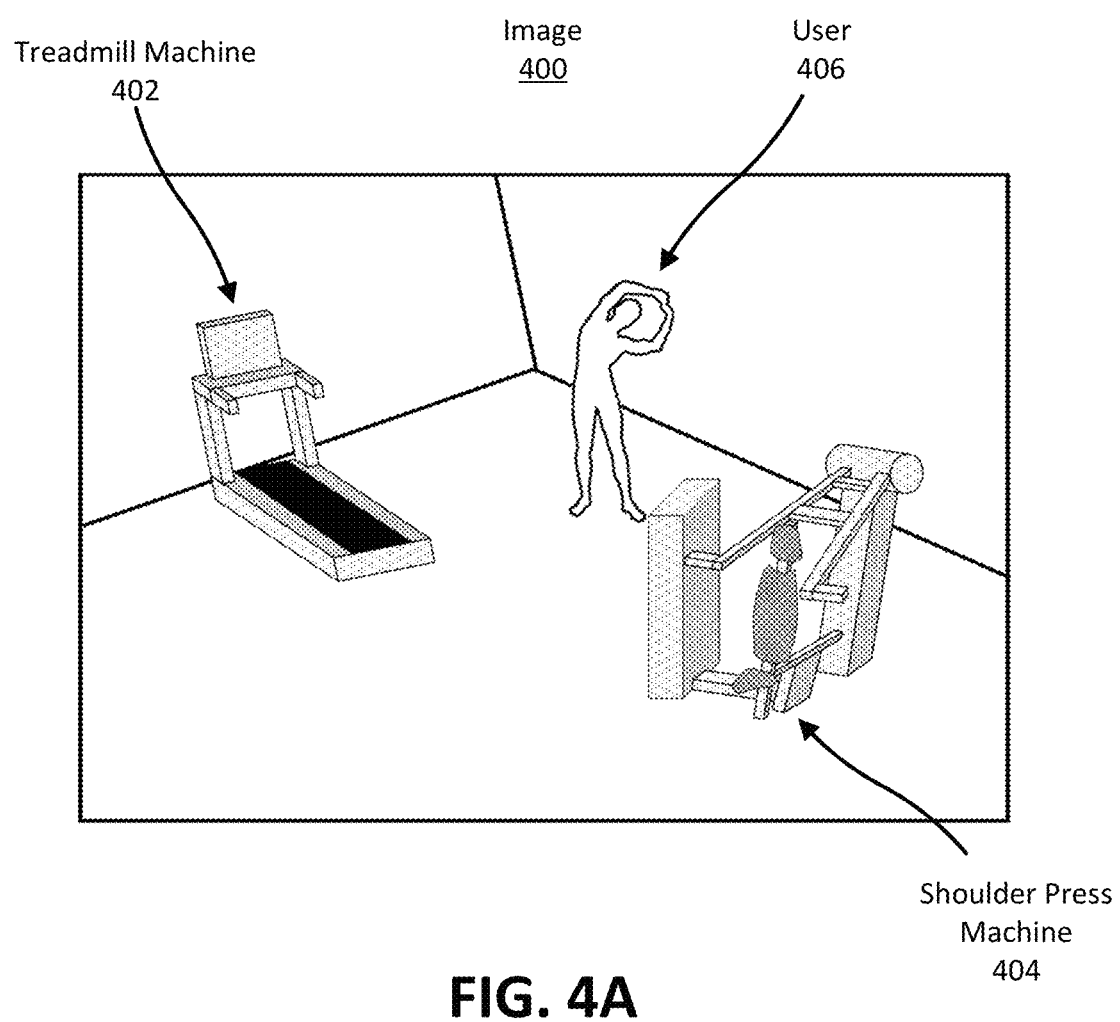
FIG. 4A is a representation of an image from an image stream according to one example embodiment.

To illustrate, FIG. 4A is a representation of an image from an image stream according to one example embodiment. The image 400 represents a portion of the observation volume captured in an image by the observation system 150. Other images in the image stream may have different viewpoints. The image 400 includes groups of pixels representing the treadmill machine 402, the shoulder press machine 404, and the user 406 within the observation volume. The image also pixels representing the space surrounding the treadmill machine 402, the shoulder press machine 404, and the user 406 within the observation volume.

Returning to FIG. 3, the MI module 130 identifies 320 a location of an active region within the image of the observation volume. To identify the location of the active region, the MI module 130 employs a region identification model implementing a convolutional neural network configured for pixel segmentation. The MI module 130 analyzes the latent information in the information sets of pixels in the image and identifies identify which pixels correspond to a movement region. The MI module 130 labels the pixels corresponding to the movement region accordingly. The MI module 130 determines a location for the active region by generating a bounding box. The bounding box includes a group of pixels surrounding the movement region. The MI module 130 applies a convex hull algorithm to the pixels within the bounding box and identifies the active region. The active region includes a group of pixels representing the movement region and a group of pixels surrounding the movement region. The active region includes the smallest number of pixels in the location that allows the MI module 130 to determine a movement in the active region.

Figure 4B:
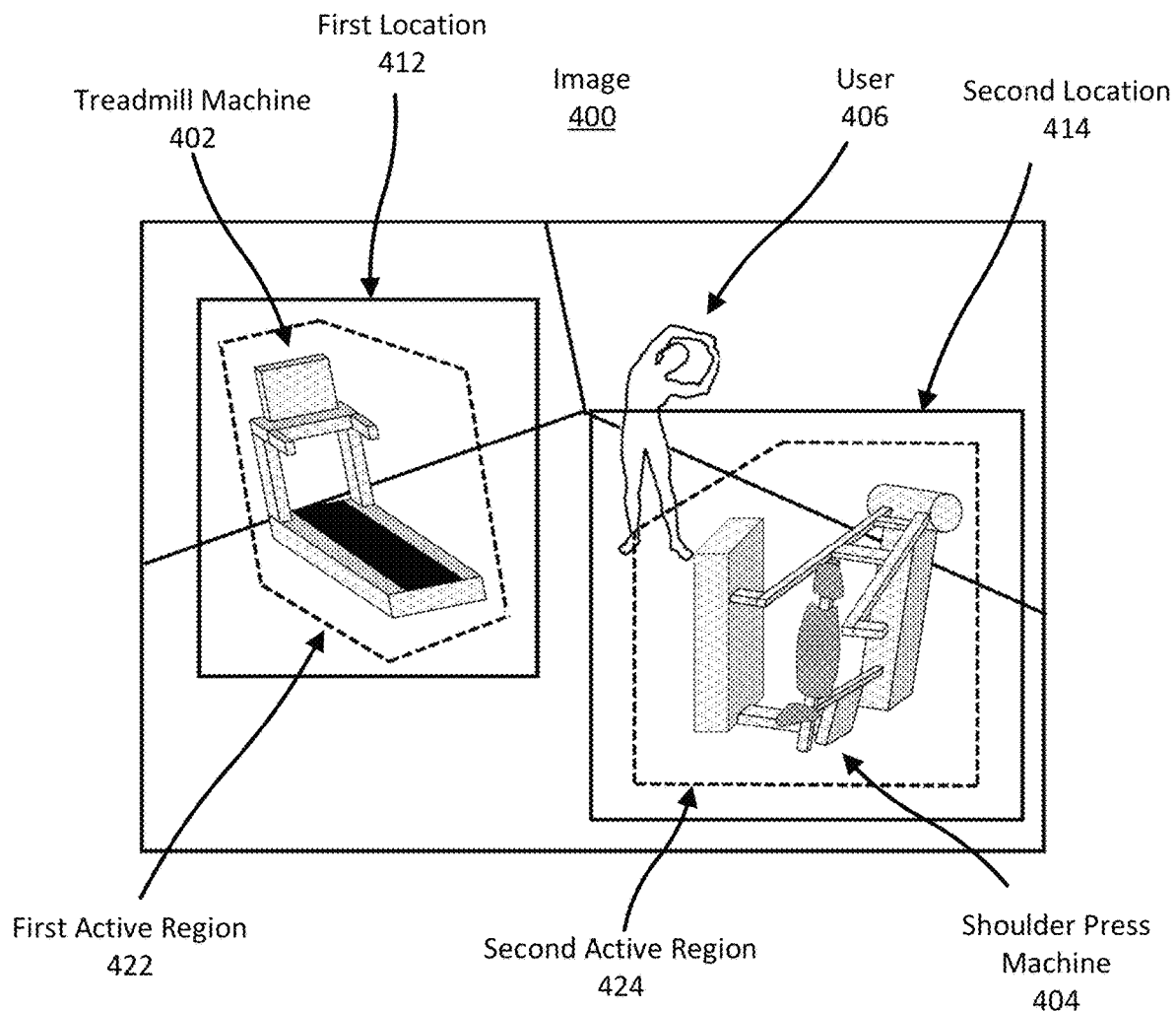
FIG. 4B is a representation of an image from an image stream including the locations of identified active regions, according to one example embodiment.

To illustrate, FIG. 4B is a representation of an image from an image stream including the locations of identified active regions, according to one example embodiment. The image 400 includes a location 412 including a first active region 422. The first location 412 and first active region surround the treadmill machine 402. The image also includes a second location 414 including a second active region 424. The second location 414 and the second active region 424 surround the shoulder press machine 404. The first location 412 and the second location 414 are illustrated as rectangular bounding boxes, but could be other shapes. The first active region 422 and the second active region 424 are illustrated as a hexagon and pentagon, respectively, but could be other shapes.

Returning to FIG. 3, the MI module 130 identifies musculoskeletal key-points for the user in the image. In an embodiment, the MI module 130 identifies key-points for a user when they are located in a location including an active region. In other words, the MI module 130 identifies key-points of a user when the pixels representing the user overlap the pixels representing a location including an active region.

To identify the key-points, the MI module 130 employs a key-point identification model implementing a convolutional neural network configured to identify key-points. The MI module 130 analyzes the latent information in the information sets for pixels in the location and identifies which pixels correspond to different key-points.

Figure 4C:
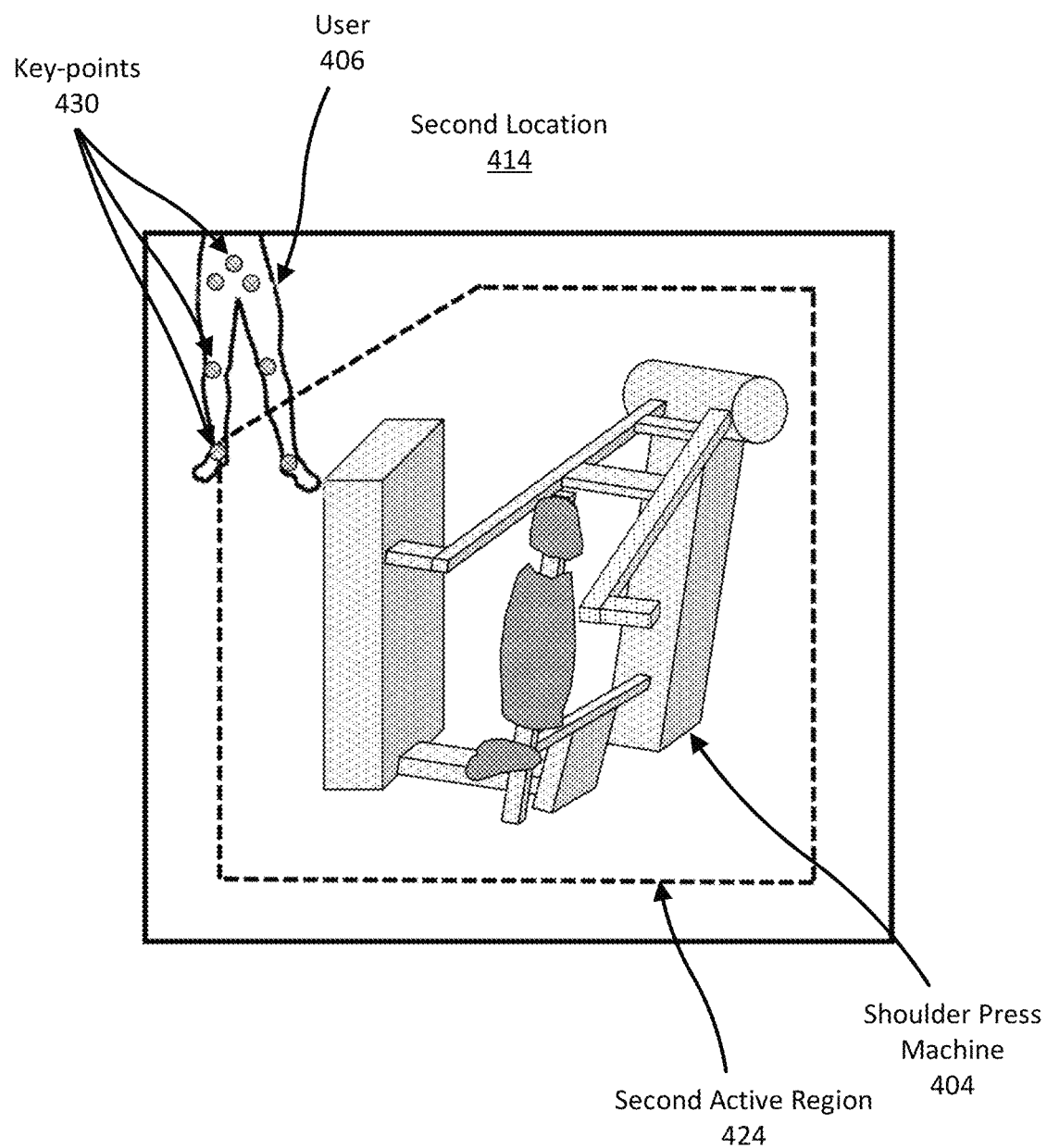
FIG. 4C is a representation of a location including key-points for the user in the location, according to one example embodiment.

To illustrate, FIG. 4C is a representation of a location including key-points for a user in a location, according to one example embodiment. Here, the location 414 is the location 414 identified in FIG. 4B surrounding the shoulder press machine 404. In this example, however, the user 406 has moved near the shoulder press machine 404 and a portion of their body is now represented as pixels overlapping the location 414. The illustration also includes a visual representation of the key-points 430 identified by the MI module 130. In this example, only a few of the key-points 430 are overlapping the active region 424.

Returning to FIG. 2 the MI module 130 determines 330 that the user enters the active region. As described above, the MI module 130 can employ a variety of methods to determine when a user has entered an active region. In a particular example, the MI module 130 determines that a user enters an active region when a threshold number of key-points in the location are within the active region. In other words, the MI module 130 identifies that a user is enters an active region when a sufficient number of key-points representing the user overlap the pixels representing an active region. Additionally, the MI module 130 identifies the user using in the active area using a facial recognition algorithm or any of the other identification algorithms described herein.

Figure 4D:
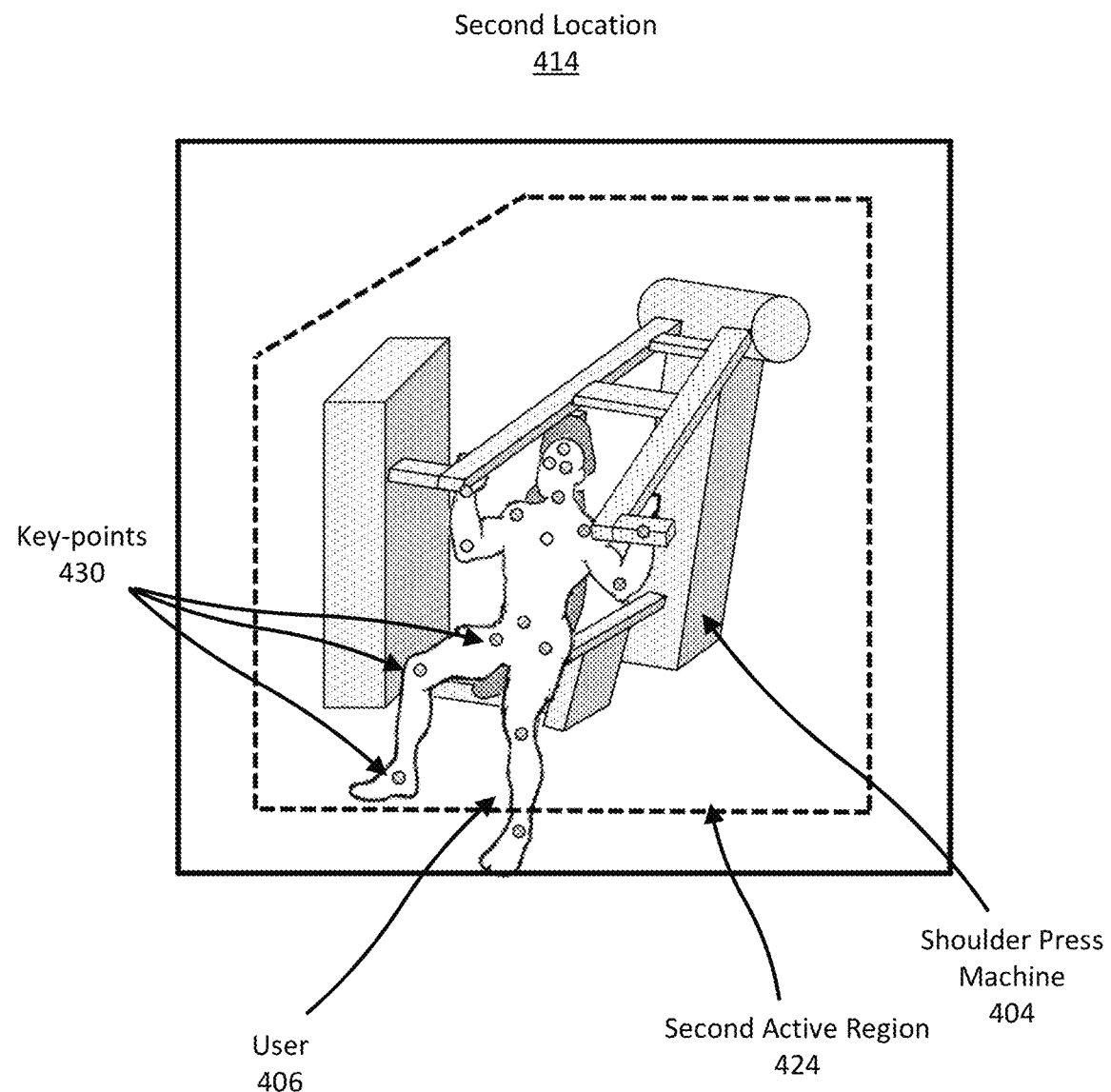
FIG. 4D is a representation of a location including key-points for a user in an active region, according to one example embodiment.

To illustrate, FIG. 4D is a representation of a location including key-points for a user in an active region, according to one example embodiment. Again, the location 414 is the location 414 identified in FIG. 4B surrounding the shoulder press machine 404. In this example, however, the user 406 has moved onto the shoulder press machine 404 and a significant portion of their body is now represented as pixels overlapping the active region 424. The illustration includes a visual representation of the key-points 430 identified by the MI module 130.

Returning to FIG. 2, the MI module 130 determines 340 a movement for the user in the active region. To identify a movement in the active region, the MI module 130 employs a movement identification model implementing a Hidden Markov Model configured to identify movements of the user. The MI module 130 analyzes the latent information in the time evolution of key-points in active region and identifies movements in the active region. In other words, the MI module 130 analyzes the time evolution of pixels in the active region representing key-points of the user to identify a movement.

Figure 4E:
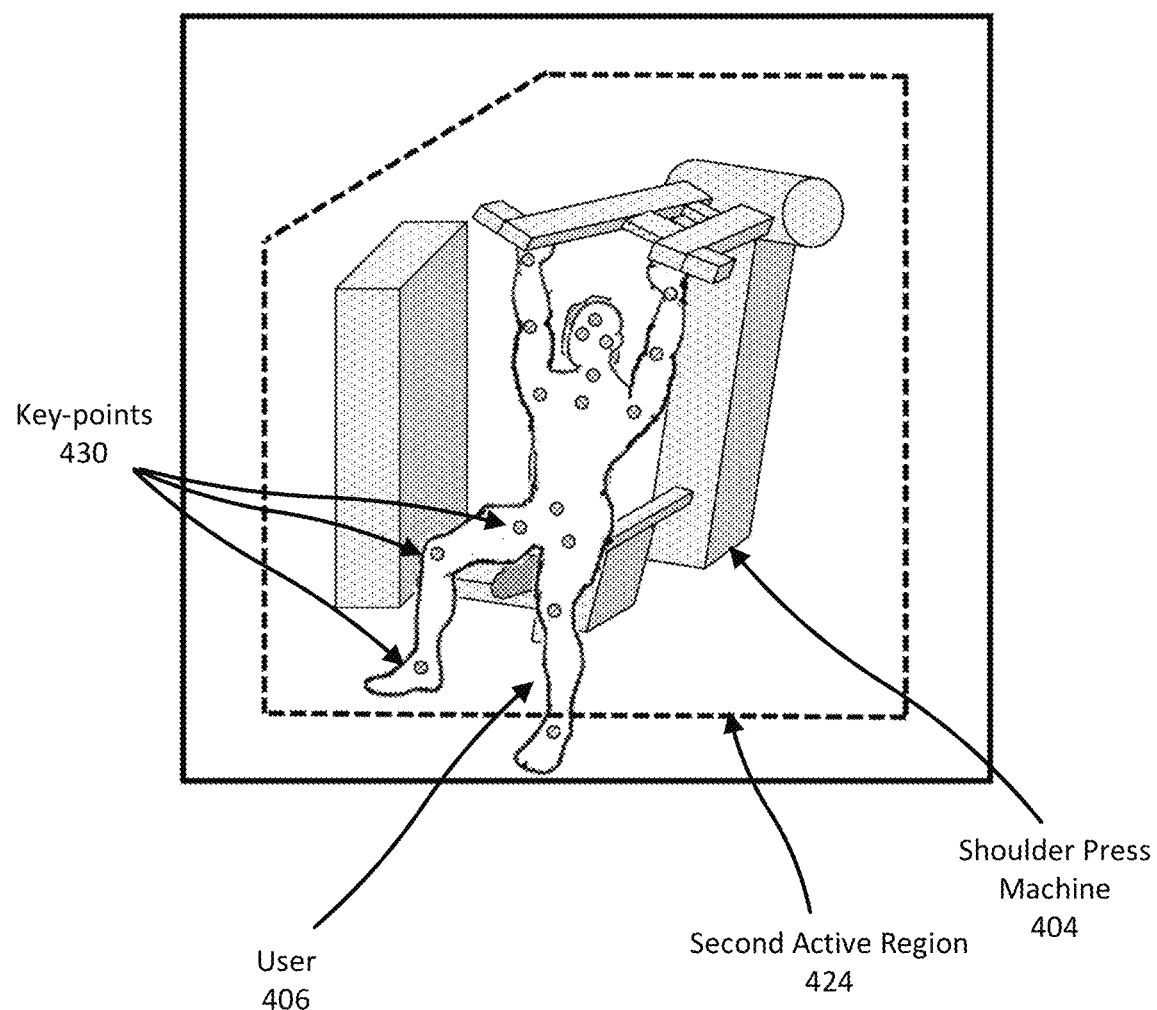
FIG. 4E is an additional representation of a location including key-points for a user in an active region, according to one example embodiment.

To illustrate, FIG. 4E is an additional representation of a location including key-points for a user in an active region, according to one example embodiment. Again, the location 414 is the location 414 identified in FIG. 4B surrounding the shoulder press machine 404. In this example, however, the user 406 has extended their arms to execute a shoulder press on the shoulder press machine 404. The illustration includes a visual representation of the key-points 430 identified by the MI module 130. To visualize the temporal change of key-points indicating a movement, notice the differences in key-points 430 representing the user arms between FIGS. 4D and 4E.

The MI module 130 determines descriptive analytics for the movement. Descriptive analytics are any information providing a more robust description of the movement as described above. To determine the descriptive analytics the MI module 130 employs a movement detection model configured to determine the descriptive analytics. The MI module 130 calculates the descriptive analytics using the location, relative location, and change in location of the key-points in an active region.

Similarly, the MI module 130 determines 350 prescriptive analytics for the movement. Prescriptive analytics are information that a user may use to inform future or current movement. To determine the prescriptive analytics the MI module 130 employs an analytics generation model configured to generate the prescriptive analytics. The MI module 130 generates the prescriptive analytics using identified movement and descriptive analytics for the movement.

The MI module 130 generates a movement summary for the movement. The movement summary includes the identified movement and the determined analytics. The movement summary is configured to be displayed on a PMA of a client system 110. The MI module 130 may store 360 the movement summary in the datastore 260 and/or transmit the movement summary to the client system 110 via the network 140.

Figure 4F:
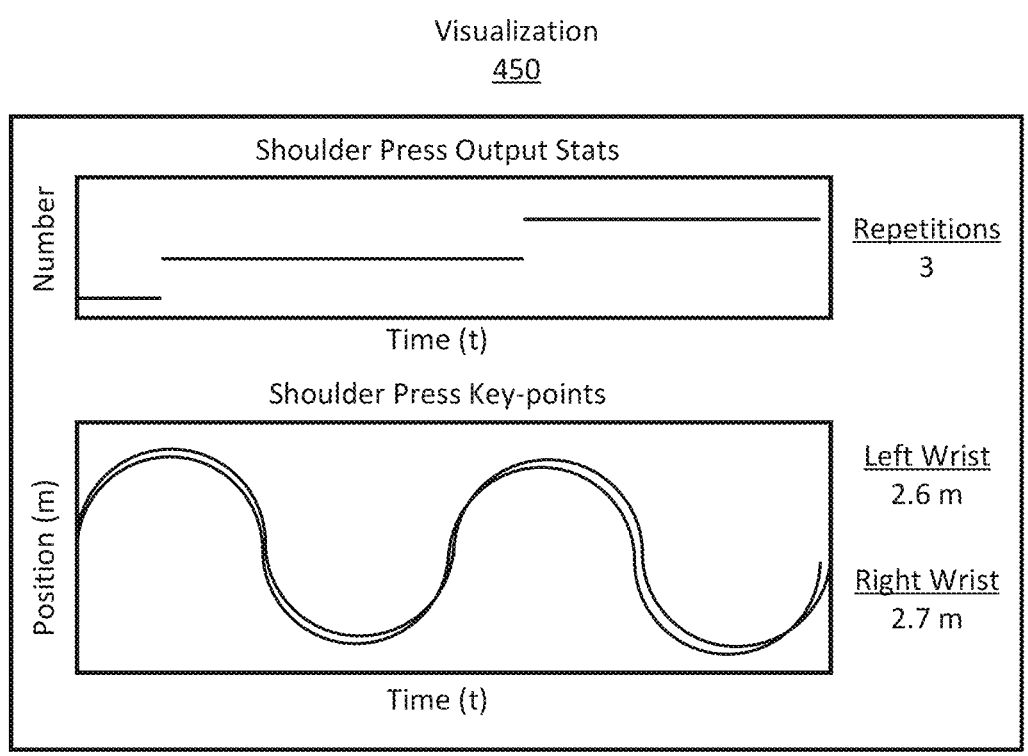
FIG. 4F illustrates an example visualization of a movement summary, according to one example embodiment.

To illustrate, FIG. 4F illustrates an example visualization of a movement summary, according to one example embodiment. The visualization 450 may be displayed on a client system 110 executing the IMA 112. The movement summary includes the number of repetitions of the shoulder press, the position of key points, and a representation of the time evolution of key-points in the active region. The sinusoidal representation of the time evolution is indicative of the up-down motion of a single repetition of a shoulder press.

Notably, the MI module 130 can perform any of the aforementioned method 300 using a three-dimensional representation of the observation volume rather than the illustrated two-dimensional representation. The MI module 130 generates the three dimensional representation using various translation functions as described herein.

Figure 5A:
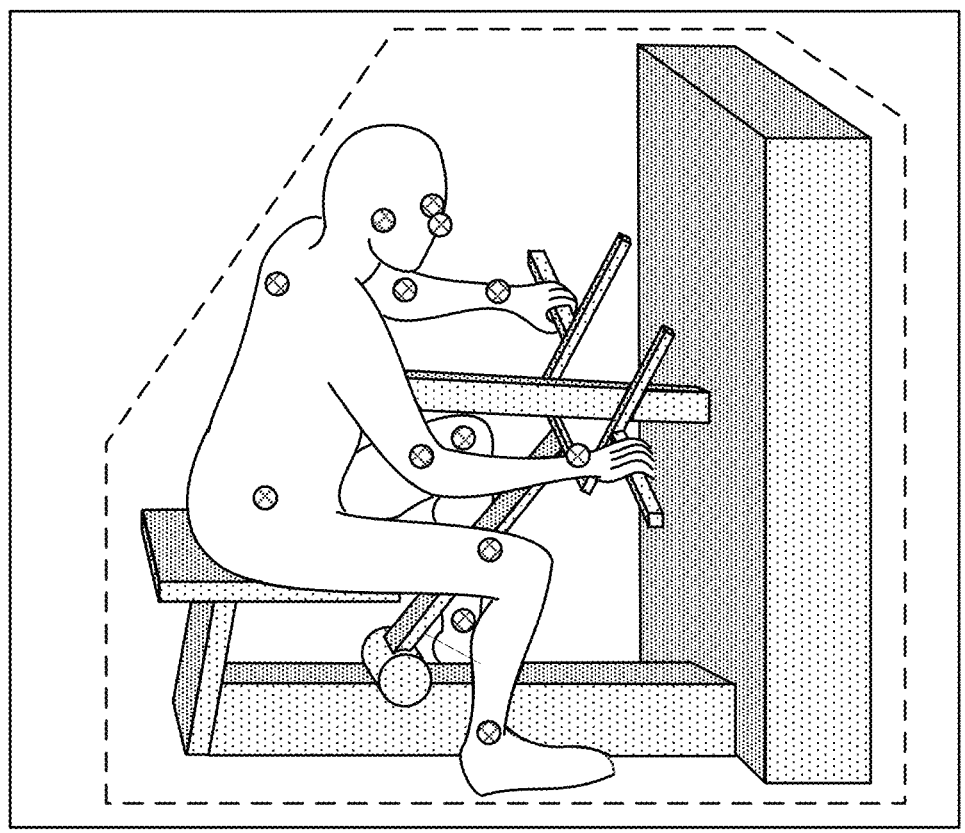
FIG. 5A is a representation of key-points in an active region for a shoulder row machine used identify a shoulder row movement, according to one example embodiment.
Figure 5B:
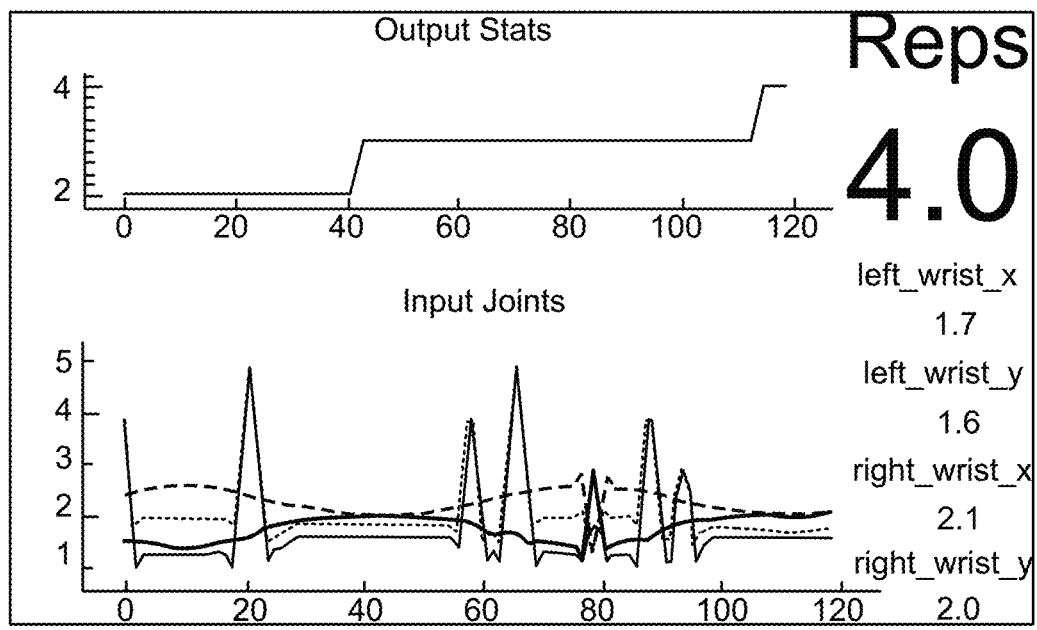
FIG. 5B is a representation of the movement summary for a shoulder row movement, according to one example embodiment.
Figure 6A:
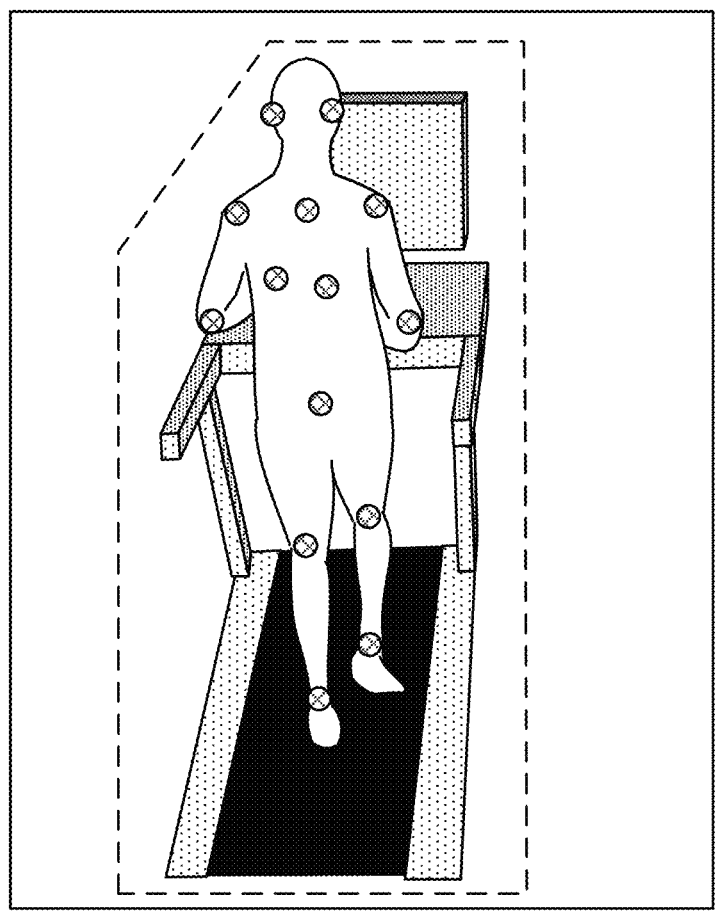
FIG. 6A is a representation of key-points in an active region to identify a running movement, according to one example embodiment.
Figure 6B:
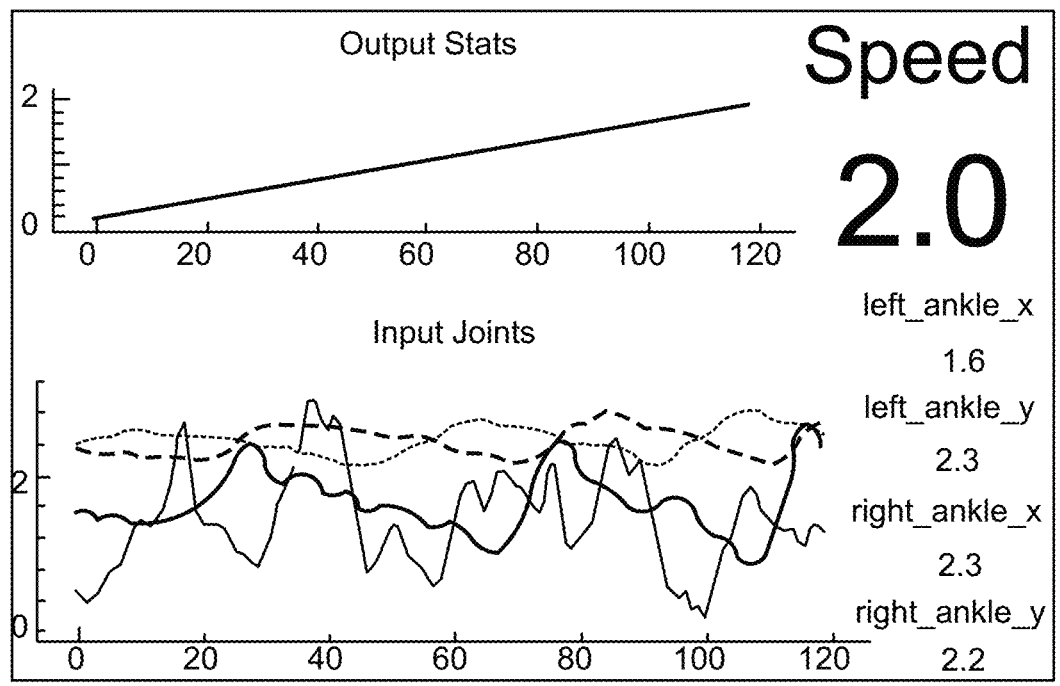
FIG. 6B is a representation of the movement summary for a running movement, according to one example embodiment.
Figure 7A:
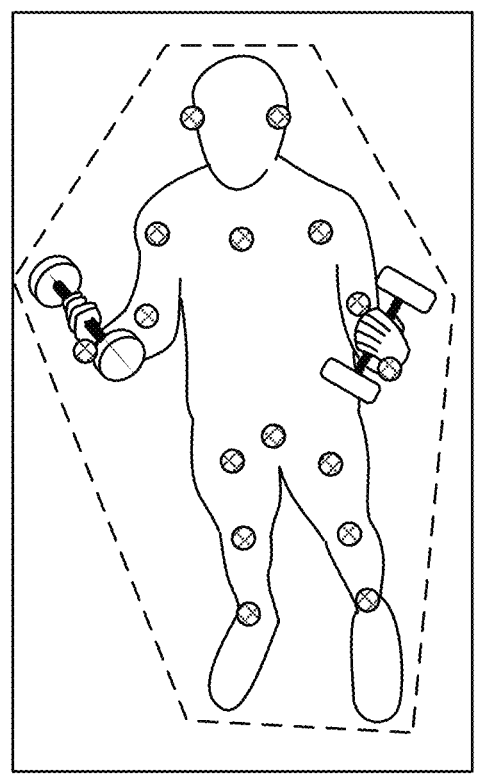
FIG. 7A is a representation of key-points in an active region for a bicep-curl space used to identify a bicep-curl movement, according to one example embodiment.
Figure 7B:
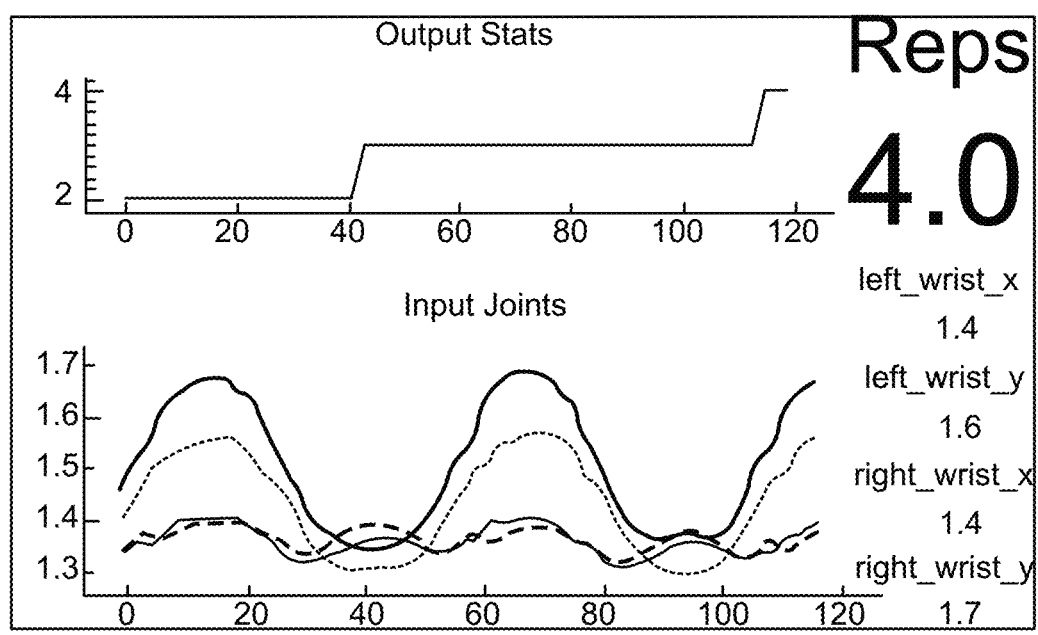
FIG. 7B is a representation of the movement summary for a bicep curl movement, according to one example embodiment.

FIGS. 5-7 illustrate examples of an IM module 330 identifying a location including an active region in an observation volume, identifying key-points of a user in the active region, and using the identified key-points to identify a movement in the active region. FIGS. 5A, 6A, and 7A illustrate a similar examples to FIG. 4E. That is, the FIGS. are images obtained of a location in an observation volume where a user is executing a movement in an active area. Within FIGS. 5A, 6A, and 7A, key-points in the active region are represented with small dots and/or small polygons. In the case where the key-point is represented as a small dot, the key-point is localized to those pixels. In the case where the key-point is represented as a polygon, the key-points are located on opposing ends of the polygon. FIGS. 5B, 6B, and 7B illustrate similar examples to FIG. 4F. That is, the FIGS. are visualizations of a movement summary displayed on an IMA 112 of a client system 110.

More particularly, FIG. 5A is a representation of key-points in an active region for a shoulder row machine used identify a shoulder row movement, according to one example embodiment. FIG. 5B is a representation of the movement summary for the shoulder row movement, according to one example embodiment. FIG. 6A is a representation of key-points in an active region for a treadmill used to identify a running movement, according to one example embodiment. FIG. 6B is a representation of the movement summary for the running movement, according to one example embodiment. Finally, FIG. 7A is a representation of key-points in an active region for a bicep-curl space used to identify a bicep-curl movement, according to one example embodiment. FIG. 7B is a representation of the movement summary for the bicep curl movement, according to one example embodiment.

V. Additional Operational Regimes

Importantly, the methods and systems described herein may be applied to other system environments and observation volumes. In a particular example, the observation volume is a warehouse including a number of employees. Each employee operates a client device as they move through the warehouse to complete item orders. While completing the item orders, the employees execute a variety of movements such as squatting, lifting, pushing, etc. In this example, the warehouse is configured with an observation system 150 to obtain images of the employees in the warehouse. A network system 120 identifies the employees' movements and generates analytics for those movements. The analytics may be provided to the employee and/or a supervisor in real time.

More generally, the systems and methods described herein can be applied to a wide variety of observation volumes in which users may execute movements. Some examples include: sport and athletic analysis for training and injury prevention in athletes, and gait analysis for disease detection and fall prevention in the elderly.

VI. Example Computer Systems

Figure 8:
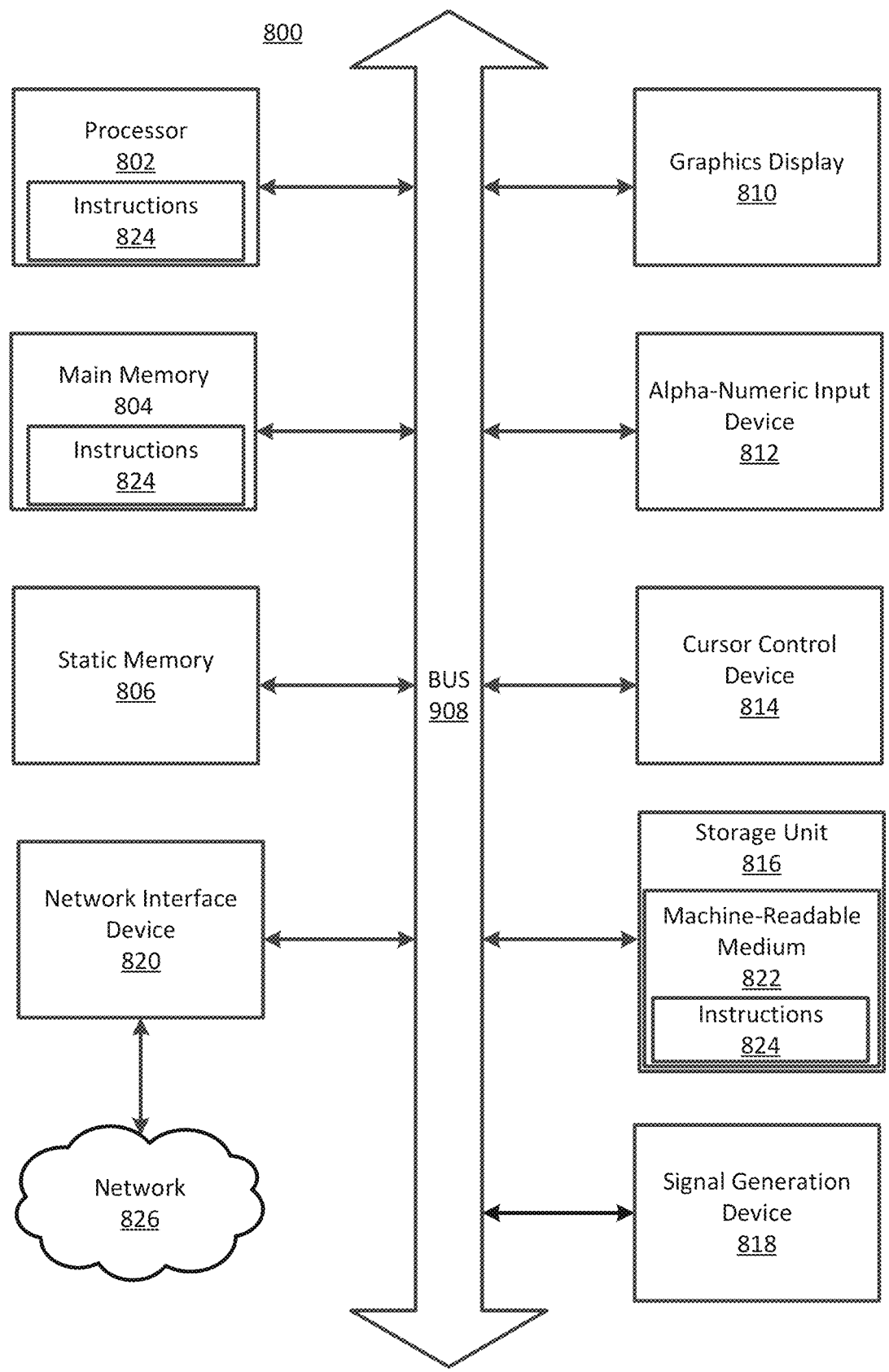
FIG. 8 is a block diagram illustrating components of an example machine for reading and executing instructions from a machine-readable medium, according to one example embodiment The figures depict various embodiments for purposes of illustration only. One skilled in the art will readily recognize from the following discussion that alternative embodiments of the structures and methods illustrated herein may be employed without departing from the principles described herein.

FIG. 8 is a block diagram illustrating components of an example machine for reading and executing instructions from a machine-readable medium, according to one example embodiment. Specifically, FIG. 8 shows a diagrammatic representation of network system 120 and client system 110 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 806 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the network system 120 described in FIG. 2. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

X. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process identifying a movement and generating analytics. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method comprising:
   accessing a motion of a person performed in a volume of interest within an area, the motion determined from a plurality of information sets describing a plurality of musculoskeletal points of the person in the volume of interest;
   determining a set of motion analytics for the motion using the plurality of information sets describing the plurality of musculoskeletal points, the set of motion analytics describing one or more characteristics of the motion of the person in the volume of interest, wherein an incorrect characteristic of the one or more characteristics indicates the motion is correctable with corrective instructions;
   determining a set of prescriptive motion analytics using the determined set of motion analytics, the set of prescriptive motion analytics comprising one or more corrective instructions corresponding to the incorrect characteristic and configured to correct the incorrect characteristic for the motion; and
   displaying the one or more corrective instructions in the area such that the person in the volume of interest may view them.

2. The method of claim 1, further comprising:
   capturing one or more images of the person performing the motion in the volume of interest within the area;
   inputting the one or more images into a movement identification module configured to:
     extract the plurality of information sets describing the plurality of musculoskeletal points of the person performing the motion in the volume of interest within the area; and
     determine the motion based on the plurality of information sets and a label of the volume of interest indicating types of motions performed in the volume of interest.

3. The method of claim 1, wherein determining the set of prescriptive motion analytics further comprises:
   identifying a label for the volume of interest; and
   determining the set of motion analytics for the motion using the plurality of information sets describing the plurality of musculoskeletal points and based on the identified label for the volume of interest.

4. The method of claim 1, wherein determining the set of prescriptive motion analytics using the determined set of motion analytics further comprises:
   identifying a form quantifying a quality of the motion performed by the person based on the motion analytics; and
   determining the set of prescriptive motion analytics based on the identified form and to improve the quality of the motion.

5. The method of claim 1, wherein determining a set of prescriptive motion analytics using the determined set of motion analytics further comprises:
    accessing a previous performance metric for the person performing the motion that quantifies a previous quality of the motion performed at a previous time; and
    determining the set of prescriptive motion analytics based on the previous performance metric to improve the motion relative to the previous quality.

6. The method of claim 1, wherein determining a set of prescriptive motion analytics using the determined set of motion analytics further comprises:
    determining an exertion score quantifying a level of effort of the person performing the motion; and
    determining the set of prescriptive motion analytics based on the exertion score.

7. The method of claim 1, further comprising storing the set of prescriptive motion analytics on a client profile associated with the person performing the motion.

8. A non-transitory computer readable storage medium storing computer program instructions that, when executed by a processor, cause the processor to:
    access a motion of a person in a volume of interest within an area, the motion determined from a plurality of information sets describing a plurality of musculoskeletal points of the person in the volume of interest;
    determine a set of motion analytics for the motion using the plurality of information sets describing the plurality of musculoskeletal points, the motion analytics describing one or more characteristics of the motion of the person in the volume of interest, wherein an incorrect characteristic of the one or more characteristics indicates the motion is correctable with corrective instructions;
    determine a set of prescriptive motion analytics using the determined set of motion analytics, the set of prescriptive motion analytics comprising one or more corrective instructions corresponding to the incorrect characteristic and configured to correct the incorrect characteristic for the motion; and
    display the one or more corrective instructions in the area such that the person in the volume of interest may view them.

9. The non-transitory computer readable storage medium of claim 8, wherein the computer program instructions, when executed by the processor, further cause the processor to:
    capture one or more images of the person performing the motion in the volume of interest within the area;
    input the one or more images into a movement identification module configured to:
        extract the plurality of information sets describing the plurality of musculoskeletal points of the person performing the motion in the volume of interest within the area; and
        determine the motion based on the plurality of information sets and a label of the volume of interest indicating types of motions performed in the volume of interest.

10. The non-transitory computer readable storage medium of claim 8, wherein the computer program instructions, when executed by the processor, further cause the processor to:
    identify a label for the volume of interest; and
    determine the set of motion analytics for the motion using the plurality of information sets describing the plurality of musculoskeletal points and based on the identified label for the volume interest.

11. The non-transitory computer readable storage medium of claim 8, wherein determining the set of prescriptive motion analytics using the determined set of motion analytics further causes the processor to:
    identify a form quantifying a quality of the motion performed by the person based on the motion analytics; and
    determine the set of prescriptive motion analytics based on the identified form and to improve the quality of the motion.

12. The non-transitory computer readable storage medium of claim 8, wherein determining the set of prescriptive motion analytics using the determined set of motion analytics further causes the processor to:
    access a previous performance metric for the person performing the motion that quantifies a previous quality of the motion performed at a previous time; and
    determine the set of prescriptive motion analytics based on the previous performance metric to improve the motion relative to the previous quality.

13. The non-transitory computer readable storage medium of claim 8, wherein determining the set of prescriptive motion analytics using the determined set of motion analytics further causes the processor to:
    determine an exertion score quantifying a level of effort of the person performing the motion; and
    determine the set of prescriptive motion analytics based on the exertion score.

14. The non-transitory computer readable storage medium of claim 8, wherein the computer program instructions, when executed by the processor, further cause the processor to store the set of prescriptive motion analytics on a client profile associated with the person performing the motion.

15. A system comprising:
    a processor; and
    a non-transitory computer readable storage medium storing computer program instructions that when executed by the processor cause the processor to:
        access a motion of a person in a volume of interest within an area, the motion determined from a plurality of information sets describing a plurality of musculoskeletal points of the person in the volume of interest;
        determine a set of motion analytics for the motion using the plurality of information sets describing the plurality of musculoskeletal points, the motion analytics describing one or more characteristics of the motion of the person in the volume of interest, wherein an incorrect characteristic of the one or more characteristics indicates the motion is correctable with corrective instructions;
        determine a set of prescriptive motion analytics using the determined set of motion analytics, the set of prescriptive motion analytics comprising one or more corrective instructions corresponding to the incorrect characteristic and configured to correct the incorrect characteristic for the motion; and
        display the one or more corrective instructions in the area such that the person in the volume of interest may view them.

16. The system of claim 15, wherein the computer program instructions, when executed by the processor, further cause the processor to:
    capture one or more images of the person performing the motion in the volume of interest within the area;

input the one or more images into a movement identification module configured to:
  extract the plurality of information sets describing the plurality of musculoskeletal points of the person performing the motion in the volume of interest within the area; and
  determine the motion based on the plurality of information sets and a label of the volume of interest indicating types of motions performed in the volume of interest.

17. The system of claim 15, wherein the computer program instructions, when executed by the processor, further cause the processor to:
  identify a label for the volume of interest; and
  determine the set of motion analytics for the motion using the plurality of information sets describing the plurality of musculoskeletal points and based on the identified label for the volume of interest.

18. The system of claim 15, wherein determining the set of prescriptive motion analytics using the determined set of motion analytics further causes the processor to:
  identify a form quantifying a quality of the motion performed by the person based on the motion analytics; and
  determine the set of prescriptive motion analytics based on the identified form and to improve the quality of the motion.

19. The system of claim 15, wherein determining the set of prescriptive motion analytics using the determined set of motion analytics further causes the processor to:
  access a previous performance metric for the person performing the motion that quantifies a previous quality of the motion performed at a previous time; and
  determine the set of prescriptive motion analytics based on the previous performance metric to improve the motion relative to the previous quality.

20. The system of claim 15, wherein determining the set of prescriptive motion analytics using the determined set of motion analytics further causes the processor to:
  determine an exertion score quantifying a level of effort of the person performing the motion; and
  determine the set of prescriptive motion analytics based on the exertion score.

* * * * *